United States Patent [19]

Frejborg

[11] Patent Number: 5,147,543

[45] Date of Patent: * Sep. 15, 1992

[54] ROTATING ELEMENT FOR A SCREENING APPARATUS WITH A CONTOUR SURFACE PRODUCED BY A PLURALITY OF PROTRUSIONS IN THE DIRECTION OF THE AXIAL LENGTH OF THE CYLINDRICAL ROTOR

[75] Inventor: Frey Frejborg, Glens Falls, N.Y.

[73] Assignee: A. Ahlstrom Corporation, Noormarkuu, Finland

[*] Notice: The portion of the term of this patent subsequent to Aug. 21, 2007 has been disclaimed.

[21] Appl. No.: 567,925

[22] Filed: Aug. 15, 1990

Related U.S. Application Data

[63] Continuation-in-part of Ser. No. 252,810, Oct. 3, 1988, Pat. No. 4,950,402, which is a continuation-in-part of Ser. No. 41,241, Apr. 22, 1987, Pat. No. 4,776,957, and Ser. No. 61,594, Jun. 11, 1987, Pat. No. 4,880,540, said Ser. No. 41,241, and Ser. No. 61,594, each is a continuation-in-part of Ser. No. 738,743, May 29, 1985, Pat. No. 4,676,903, which is a continuation-in-part of Ser. No. 472,742, Mar. 7, 1983, Pat. No. 4,529,520.

[51] Int. Cl.⁵ .......................... B01D 29/62; B07B 1/20
[52] U.S. Cl. ...................................... 210/413; 209/273
[58] Field of Search ................... 162/55, 380; 209/273, 209/300, 305, 306, 379, 397; 210/413, 415, 498

[56] References Cited

U.S. PATENT DOCUMENTS

| | | | |
|---|---|---|---|
| 3,586,172 | 6/1971 | Young | 209/273 |
| 4,776,957 | 10/1988 | Lampenius et al. | 210/413 |
| 4,950,402 | 8/1990 | Frejborg | 209/273 |

*Primary Examiner*—Ivars Cintins
*Attorney, Agent, or Firm*—Buchnam and Archer

[57] ABSTRACT

An apparatus for screening pulp comprises a vessel, a cylindrical screen within the vessel, a cylindrical rotor moving in the vicinity of the screen at a predetermined speed, an inlet for the unscreened pulp, an outlet for the screened pulp in the vessel. The rotor has a contour surface which is achieved by means of a plurality of protrusions of contoured shape on the surface of the rotor, for instance by welding. The protrusions are spaced and are arranged along the entire axial length of the rotor.

23 Claims, 13 Drawing Sheets

ROTATING ELEMENT FOR A SCREENING APPARATUS WITH A CONTOUR SURFACE PRODUCED BY A PLURALITY OF PROTRUSIONS IN THE DIRECTION OF THE AXIAL LENGTH OF THE CYLINDRICAL ROTOR

The present application is a continuation-in-part of U.S. Ser. No. 252,810 filed Oct. 3, 1988 which is a continuation-in-part of U.S. Ser. No. 041,241 filed Apr. 22, 1987 and U.S. Ser. No. 061,594 filed Jun. 11, 1987. U.S. Ser. Nos. 041,241 and 061,594 are continuations-in-part of U.S. Ser. No. 738,743 filed May 29, 1985 which issued as U.S. Pat. No. 4,676,903. U.S. Ser. No. 738,743 is a continuation-in-part of U.S. Ser. No. 472,742 filed Mar. 7, 1983 which issued as U.S. Pat. No. 4,529,520 on Jul. 15, 1985. U.S. Ser. No. 041,241 and U.S. Ser. No. 061,594 have issued as U.S. Pat. No. 4,776,957 and U.S. Pat. No. 4,880,540 respectively. The subject matter of U.S. Ser. Nos. 472,742, 738,743, 041,241, 061,594 and 252,810 is incorporated herein by reference U.S. Ser. No. 252,810 has issued as U.S. Pat. No. 4,950,402 on Aug. 21, 1990.

The present invention relates to a screening apparatus which is intended primarily for screening and purification of pulp and more specifically paper pulp. This screening apparatus comprises a vessel, a cylindrical screen in the interior of the vessel, a cylindrical rotor which moves in the vicinity of the screen surface, an inlet for the pup to be screened, an outlet for the reject and another outlet for the screened pulp, which is called the accept.

In U.S. Pat. No. 4,529,520, the screening apparatus has an inlet on one side for introducing the unscreened pulp, and an outlet in the opposite side for removing the reject portion. Means are provided for moving the unscreened pulp along one first direction of flow. The screen plate has grooves in the side of the inlet recessed in the screen surface, the first direction of flow being essentially transverse to the grooves. The grooves are formed of an upstream side plane, a downstream side plane and a bottom plane. The bottom plane is essentially parallel to the envelope surface of the screen plate. The grooves have apertures, holes or slots, in the bottom pane. The upstream side plane of the grooves, as seen standing from the bottom of the grooves, is substantially perpendicular to the envelope surface and the downstream side plane of the grooves forms an angle of 60°–5° against the envelope surface. According to one embodiment, the angle between the downstream side plane of the grooves and the envelope surface of the screen plate is about 30°.

U.S. Pat. No. 4,676,903 defines a rotor intended to increase the intensity of the pulses generated near the openings, either holes or slots within the screen plate, for the purpose of creating the negative pulses necessary to backwash the screen and to prevent plugging. The screen has an inlet side and an outlet side and the rotor is located on the inlet side of the screen. The rotor described in this patent has a contoured surface, with grooves formed of a first plane parallel to the envelope surface, an inclined plane, an upper plane and a side plane, the side plane is essentially perpendicular to the first plane, the inclined plane forming an angle between 30°–60° with the first plane, the upper plane being parallel to said first plane. Also the screen cylinder has a contoured surface with grooves.

In the paper-making process, pulp is produced by cooking wood which separates the wood into fibers. Due to the different properties of the wood even from the same tree, some of the fibers do not separate and are dispersed as fiber bundles usually called debris, shives or slivers which form the reject. There are also other impurities, such as bark, which must be removed. The screen must separate the undesired impurities and debris called the rejects from the accept portion. In order to avoid substantial losses of fibers which could be carried over together with the debris in the reject portion, it is necessary to remove the impurities efficiently and selectively.

It should be stressed that different applications have different requirements. In some applications, it is necessary to achieve a high content of long fibers, especially secondary fibers, in the accept because the long fibers give strength to the final product, for instance paper. In other applications, on the other hand, the contrary is true. For instance, in virgin or pulp mill fibers, it is desirable to concentrate the long fibers in the reject for reject refining.

A great deal of work has been carried out in connection with screen plates and rotors and it has been recognized that means to create pulsations with the rotor will increase the efficiency of the screening apparatus. U.S. Pat. No. 3,363,759 and U.S. Pat. No. 4,318,805 describe drum rotors with a bumped surface which provides pulsations. In U.S. Pat. No. 4,318,803 the bumps take the form of pins projecting from the rotor with enlarged heads, the heads providing the pulses while the pins offer little resistance to flow.

U.S. Pat. No. 4,200,320 and U.S. Pat. No. 4,200,537 describe rotors which carry blades or vanes moving in the vicinity of the screen which produce a positive pulse. Other patents describe other types of rotors, for instance, U.S. Pat. No. 3,726,401 uses a rotor with bumps or protuberances which produce about equal positive and negative pulses. According to this patent, any form of bumps may be used provided it produces the desired pulses, the bumps and the depressions between them creating positive screening and negative screen cleaning pressure pulses.

U.S. Pat. No. 3,400,820 describes a rotary member made up of a plurality of separate segments joined together and forming a selective undulating pattern which produces about equal positive and negative pulses.

One object of the present invention is to provide a rotor which provides high intensity axial shear stresses in addition to high intensity pulses both positive and negative generated near the openings, either holes or slots, within the screen plate, for the purpose of creating the positive pulses to help force the longer fibers through the openings within the screen and the negative pulses which are necessary to backwash the screen and to prevent plugging.

Still another object is to provide a rotor which may be used in an apparatus in which the screen has an inlet side and outlet side and the rotor is located on the inlet side of the screen, but the contour surface of the screen may be the outer or the inner surface of the screen cylinder and the flow of the accept may be either inwardly or outwardly.

Another object is to provide a rotor which produces sharp and steep pulses, thus resulting in high intensity.

Another object is to provide a rotor which permits to operate with smaller apertures in the screen cylinder thus improving the screening efficiency.

Still another object is to provide a rotor which may be used in conjunction with the screen plate described and claimed in U.S. Pat. No. 4,529,520 but is not limited to the screen plate of this patent because other contoured surfaces may be used.

Specifically, an object of the present invention is to provide a rotor which generates a combination of high intensity positive and negative pulses, while still maintaining a cylindrical rotor which is easier and less expensive to manufacture.

Further, for some specific applications, for instance, in virgin pulp mill screening, and especially with mechanically produced fibers, it is preferable to avoid the high radial pumping action resulting from a non-cylindrical rotor where rejects might undesirably go through.

It has now been found that both the specific contour of the rotor surface and the contoured surface of the screenplate are particularly advantageous in producing a combination of higher intensity pulses and sufficient negative pulses so that plugging of the screen is minimized, due both to the contour shape of the surface of the rotor and the contoured surface of the screenplate.

U.S. Ser. No. 252,810 describes a rotor with a non-cylindrical shape having a contour surface produced by grooves or bars on the rotor surface. It has now been found that substantial advantages for some specific applications are achieved if the rotor is cylindrical and if the bars form a plurality of spaced protrusions in the direction of the axial length of the rotor, instead of a single bar along the axial length of the rotor.

The present invention will be illustrated in more detail by reference to the accompanying drawings of which:

FIGS. 2 and 2a illustrate the nature of the pulses produced from a rotor with a contour surface according to FIGS. 1 and 1a.

Figure 1:
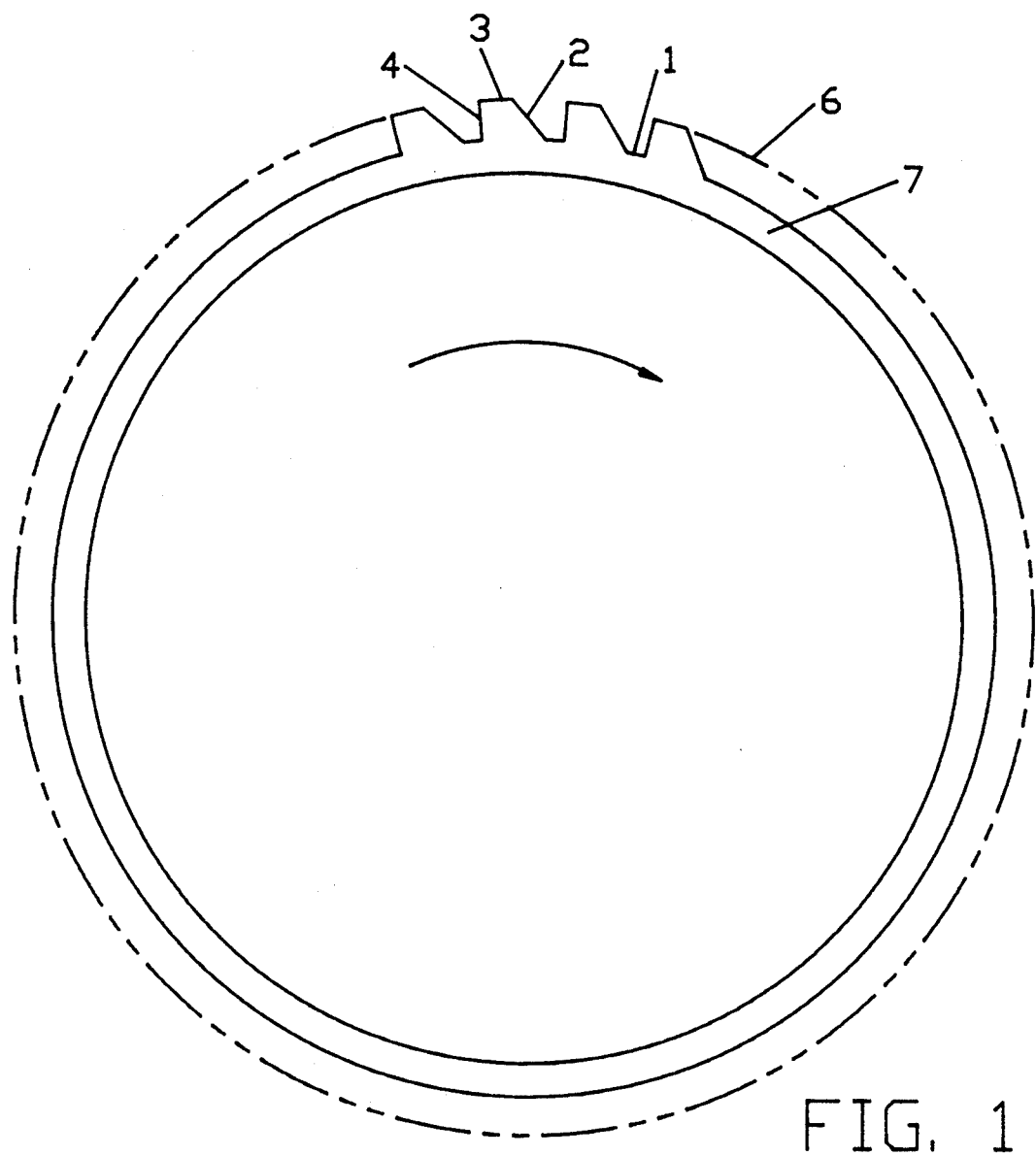
FIGS. 1 and 1a, illustrate the contour surface of the rotor according to U.S Pat. No. 4,676,903.
Figure 1A:
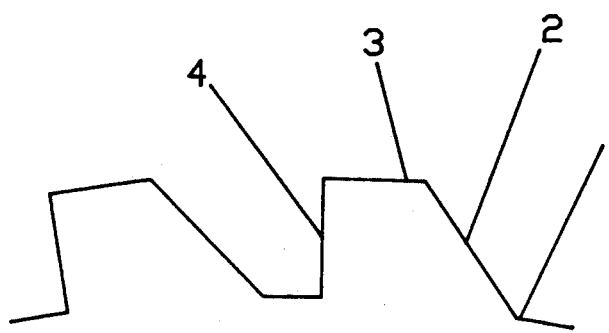
Figure 2:
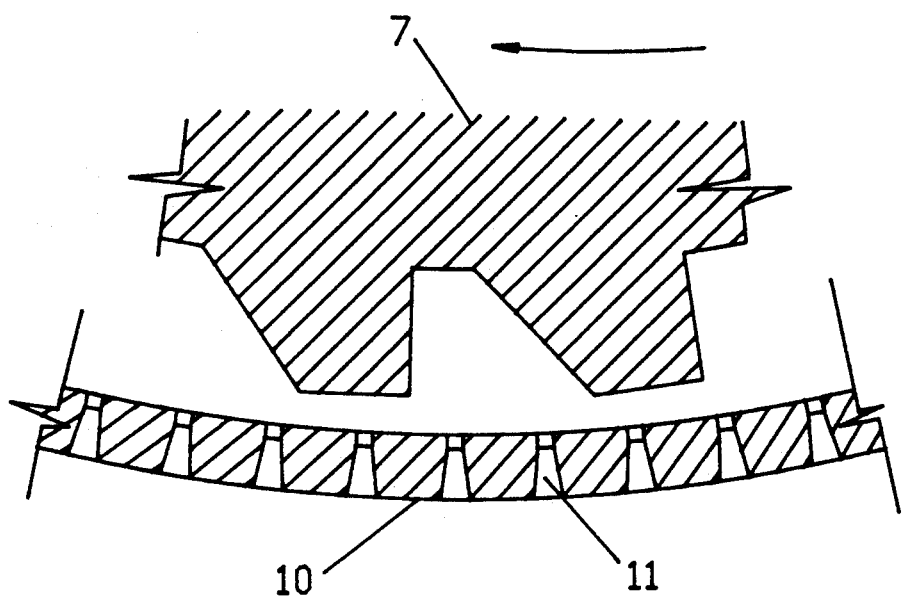
Figure 2A:
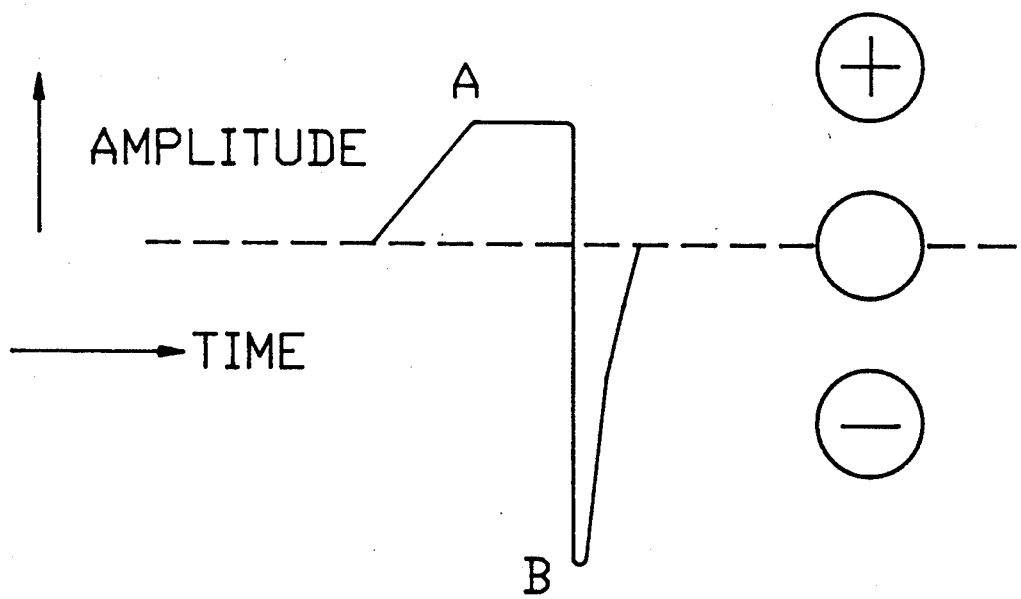

By reference to FIGS. 1 and 1a, numeral 1 designates the first plane and numeral 2 designates the inclined plane. Numeral 3 designates the upper plane and numeral 4 designates the side plane perpendicular to the first plane. The rotor according to U.S. Pat. No. 4,676,903 has been found to be very satisfactory in some applications where the sharp negative pulse and the severe and rapid change in pulsations is desirable for backflushing. It has now been found that substantial improvement in energy reduction is achieved if instead of grooves, protrusions in the rotor surface are formed, and if the protrusions do not extend along the entire axial length of the rotor, but a plurality of protrusions is formed as shown in FIGS. 3, 4, 5 and 6.

In order to achieve a screening apparatus with low energy requirements and higher screening efficiency, contour shape protrusions may be of different designs and the orientations on the rotor surface may be different to produce different results for various applications.

The contour shape protrusions according to the present invention are arranged along the entire axial length of the cylindrical rotor. The protrusions are arranged to produce high intensity pulses over the entire screen cylindrical surface without the need to make the protrusions the full length of the rotor. This is preferably, but is not essential, accomplished by spacing the protrusions in rows such that a spacing is provided between adjacent protrusions in one row and the two protrusions of the next row are offset and face the spacing in the preceding row by making the length of the protrusions shorter, the overall energy requirement of the screening apparatus is reduced, due to lower pumping forces. Further, screening is improved inducing more turbulence in the screening area between the rotor and the screen cylinder. Still another advantage is that the short protrusions reduce the swirling motion of the fluid within the screening zone.

It should be noted that pulses produced from the contour shape protrusions are different in magnitude, intensity, and frequency depending upon their specific shape, size, rotor speed and orientation.

Figure 3:
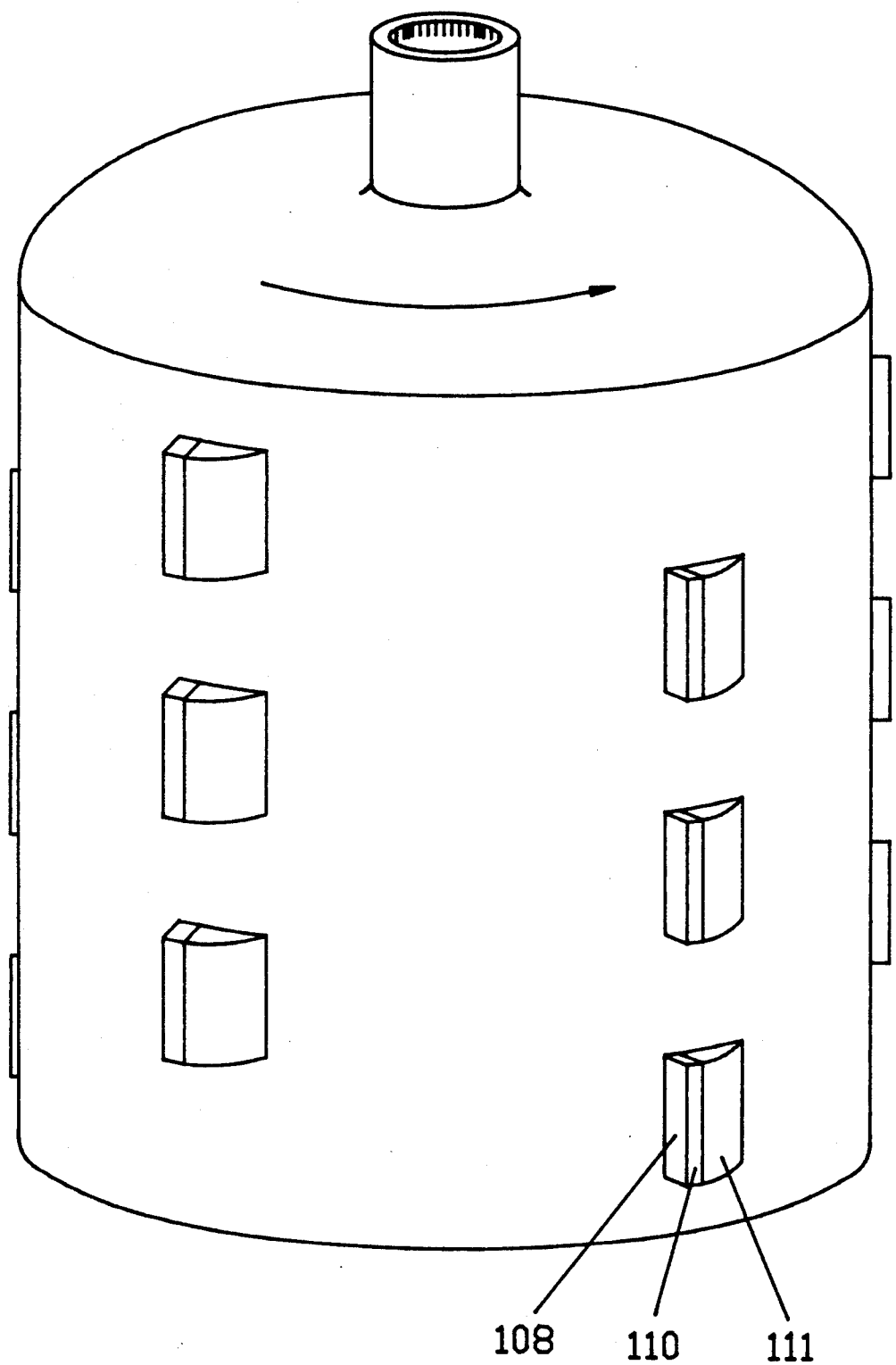
FIG. 3 illustrates one embodiment of the rotor according to the present invention with protrusions in which the leading surface 108 is perpendicular to the rotor surface.

In FIG. 3 side plane 108 is the leading plane or surface of the protrusions followed by the upper plane or surface 110 forming an essentially right angle with the side plane or surface. Trailing the upper plane or surface 110 is the inclined plane or surface 111 which is at an angle between 5° and 60° in reference to the upper plane.

In the embodiment of FIG. 3, a sharp intensity positive pulse is produced from the leading side plane 108 which is at a right angle to the rotor surface followed by a negative pulse which is less intense but higher in magnitude due to the inclined plane or surface 111. The leading side plane 108 produces a high intensity pulse because the rate of displacement of the fluid within its path is very high due to the right angle surface. The negative pulse from the inclined plane o surface 111 helps backflushing the apertures within the screen keeping them from plugging. The greater the angle of the inclined plane, the greater is the negative pulse produced.

Figure 4:
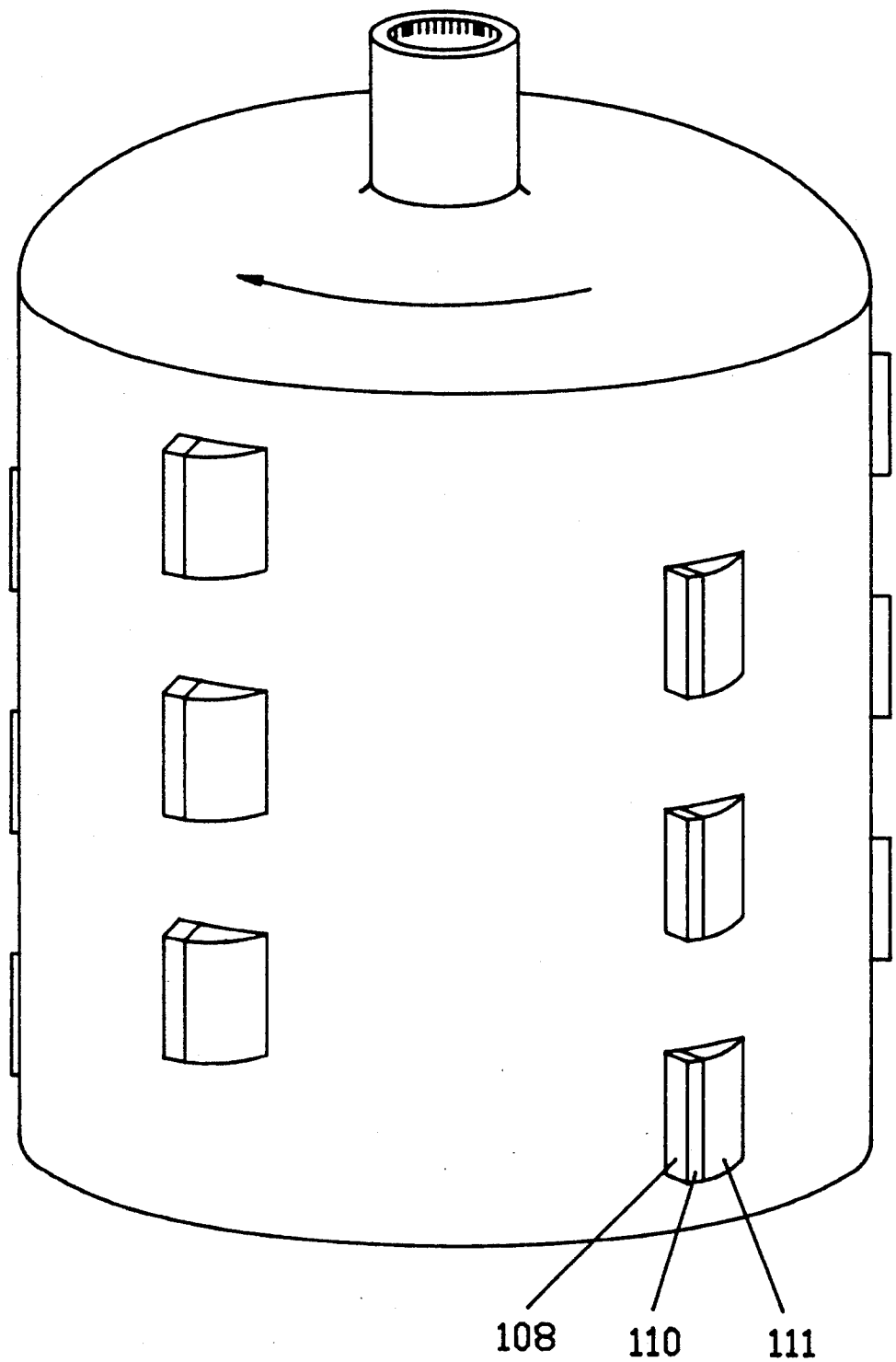
FIG. 4 illustrates another embodiment of the rotor with protrusions in which the inclined surface is the leading surface.

In the embodiment of FIG. 4, the inclined plane 111 is the leading surface of the protrusions followed by the upper plane 110 and side plane 108. A rotor with protrusions of this configuration is advantageously used in a screening apparatus when less intense positive pulses are desired to reduce the tendency to force long fibers and reject through the apertures within the screen, for example, in a pulp mill screening when high concentration of the rejects and long fibers is desired for reject refining.

Figure 5:
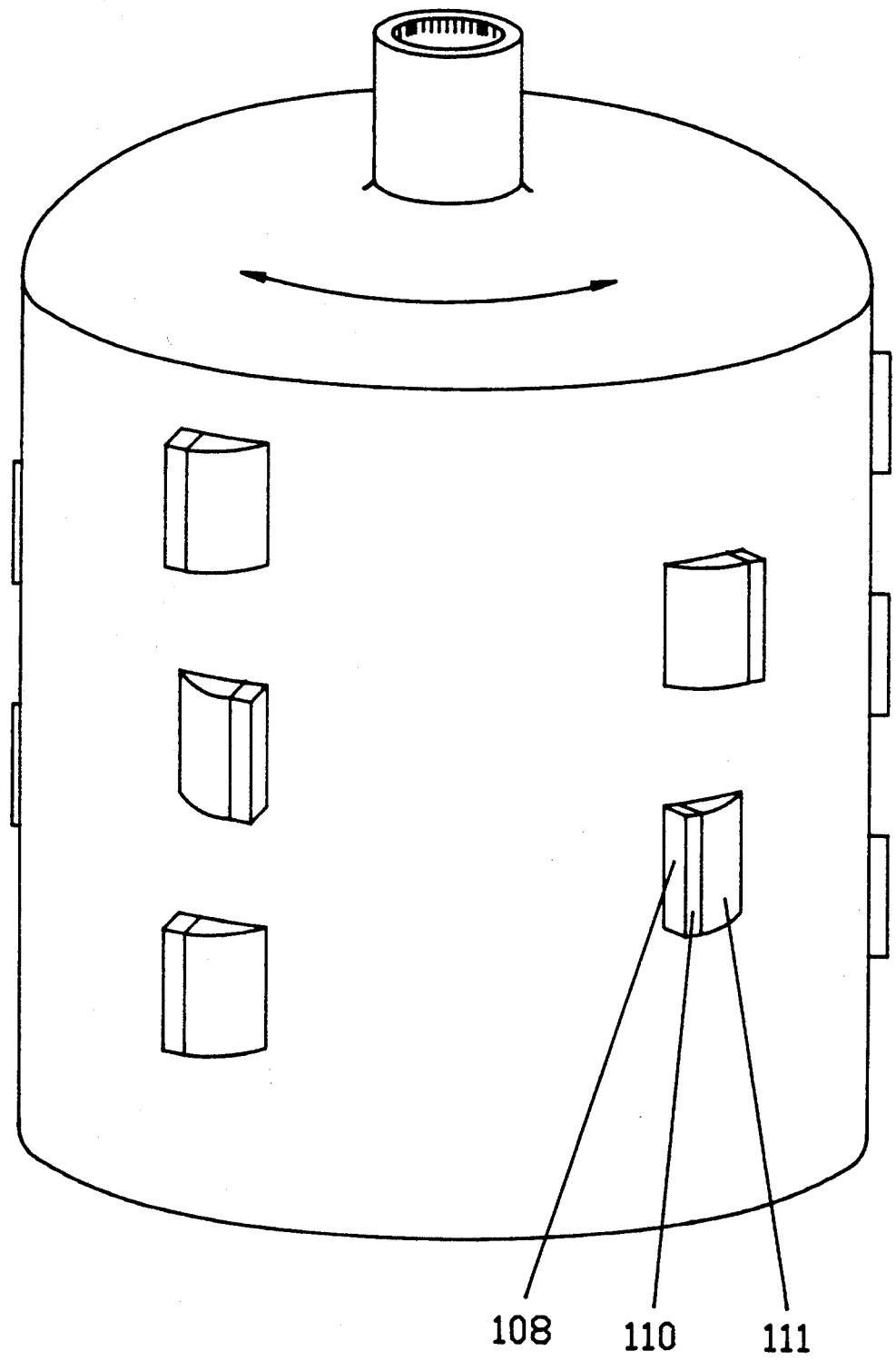
FIG. 5 illustrates the embodiment according to which some of the surfaces perpendicular to the rotor surface and some of the surfaces inclined with respect to the rotor surface are leading surfaces.

FIG. 5 illustrates an embodiment in which the leading surfaces of the protrusions is either the inclined plane 111 or the side plane 108. This rotor configuration produces a combination of high positive and negative pulses.

Figure 6:
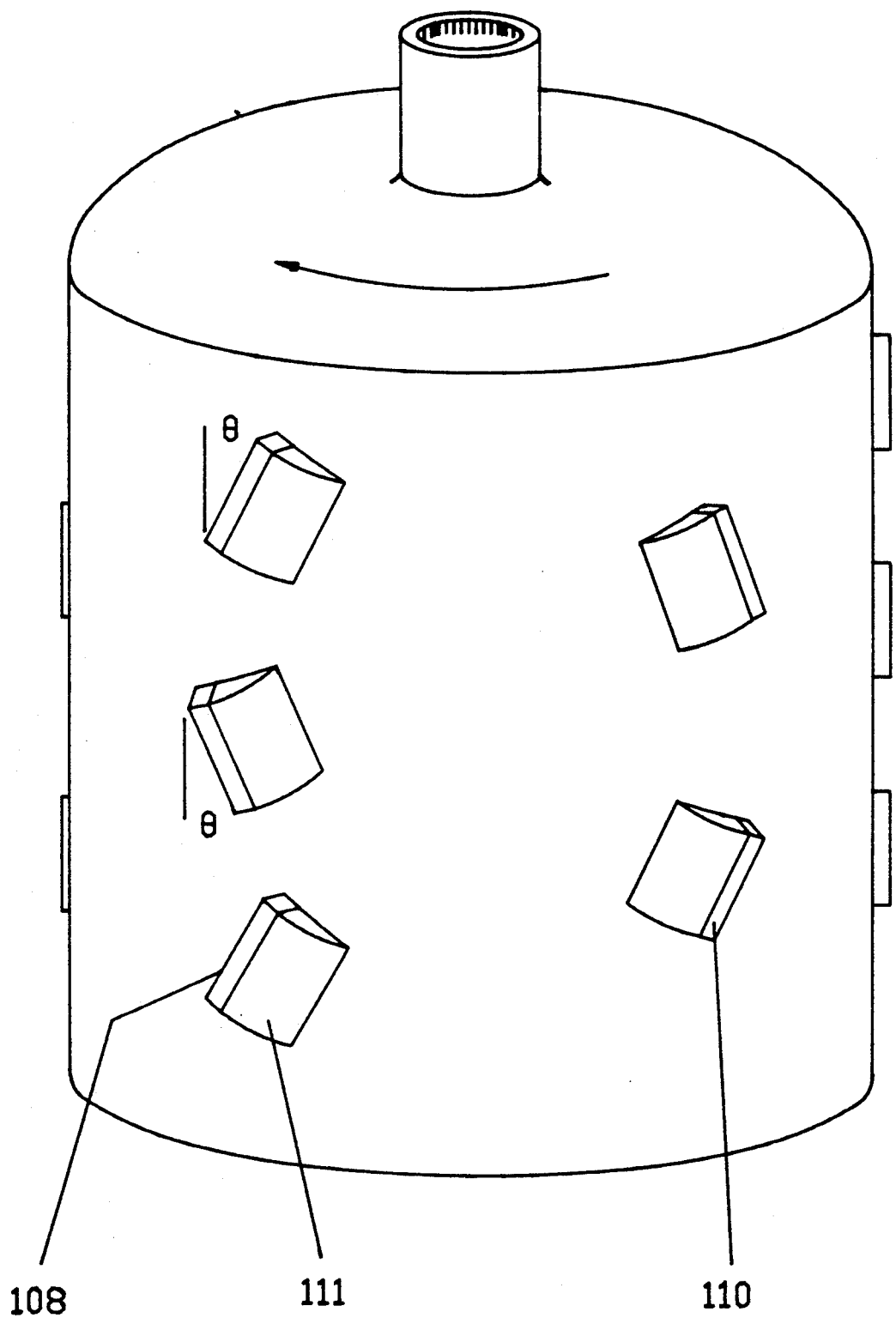
FIG. 6 illustrates one embodiment according to which the protrusions are inclined with respect to the axis of the rotor and the leading surface is essentially perpendicular or inclined with respect to the rotor surface. The inclination may be varied.

The embodiment of FIG. 6 is similar to the embodiment of FIG. 5 with the leading surfaces alternating between at least one of the inclined planes or surfaces and at least one of the side planes or surfaces with the difference that the protrusions are oriented at an angle in respect to the axis of rotation of the rotor. The angle of orientation is normally between 0° and 60° with 45° being a typical orientation either positive or negative angle as shown in FIG. 6. This rotor configuration is advantageously used in screening applications when more turbulence within the screening zone is desired to help fluidize the stock by making it easier to screen the stock at high consistencies with fine apertures. This increase in fluidization is obtained by rapidly changing continuously the direction of the stock flow within the screening zone. As shown in FIG. 6 these changes in flow direction are accomplished by angling the contour shape protrusions away from the axis of rotation. By angling these protrusions, some positive and some negative, axial flows are induced in both directions and the pulses produced by the protrusions are changed by having some leading planes or surfaces, the side plane or surface 108 and others having the inclined plane or surface 111 as the leading surfaces. This combination produces increased turbulence which gives the desired fluidization for improved screening.

Figure 7A:
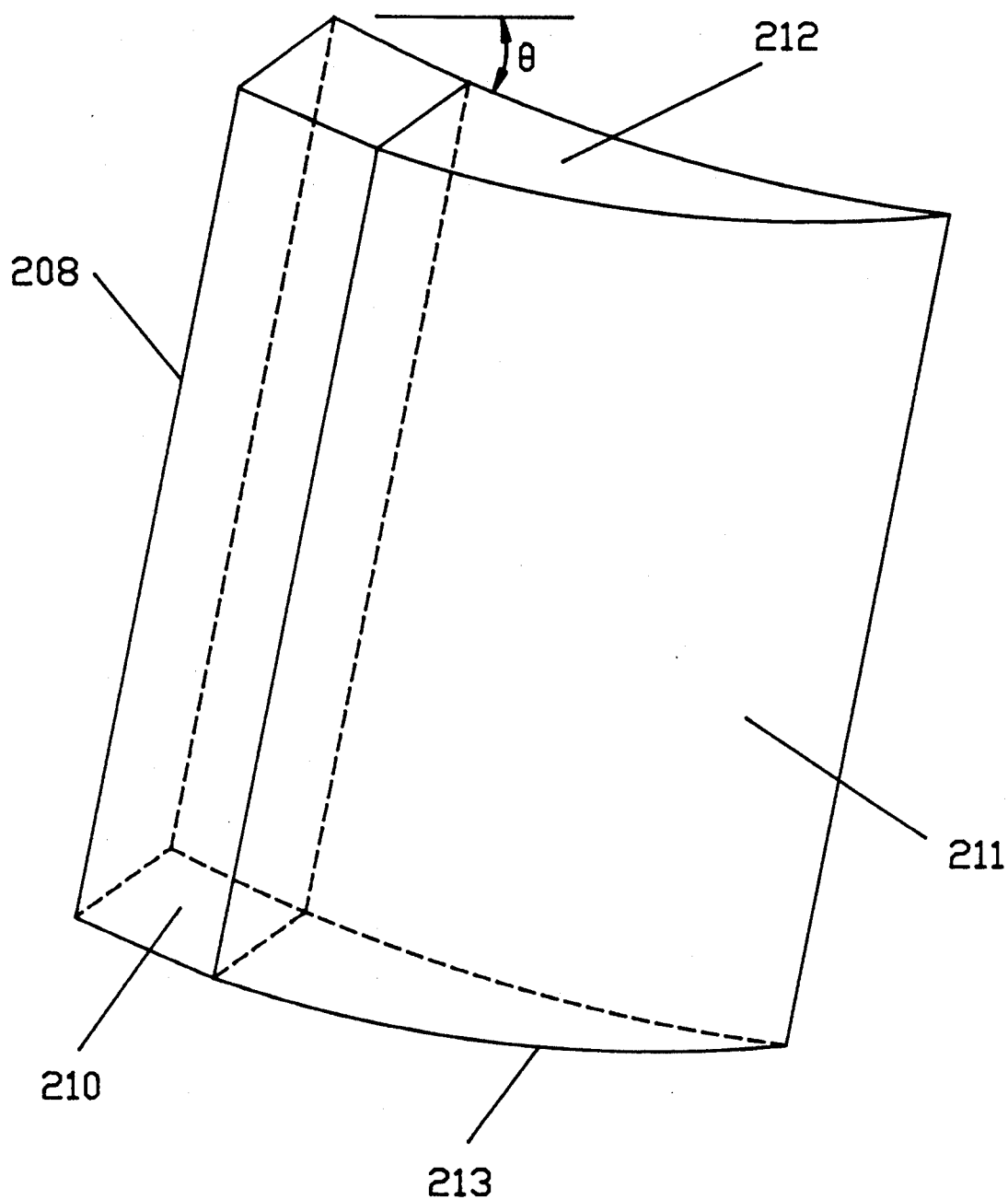
FIGS. 7A, 7B and 7C illustrate different shapes of protrusions.

The protrusions shown in FIGS. 3 through 6 may have slightly different shapes as shown in FIGS. 7A, B and C. Different shapes are advantageously used for various screening applications because the desired end results are not always the same as previously explained.

FIG. 7A shows a typical contour shape protrusions with a side plane 208, upper plane 210, inclined plane 211, and two edge surfaces 212 and 213 respectively. The side plane 208 is always at right angles to the rotor surface and intersects the upper plane 210 forming another right angle. Intersecting the upper plane is the inclined plane 211 at an angle between 5° and 60° with respect to the upper pane. The two edge surfaces 212 and 213 start from the rotor surface and intersect the inclined plane 211 forming a right angle. The edge surfaces may be parallel to the direction of rotation or angled at some angle $\phi$ as shown in FIG. 10A. This angle $\phi$ may be either a positive or negative with a typical value between 0° and 60°.

Figure 7B:
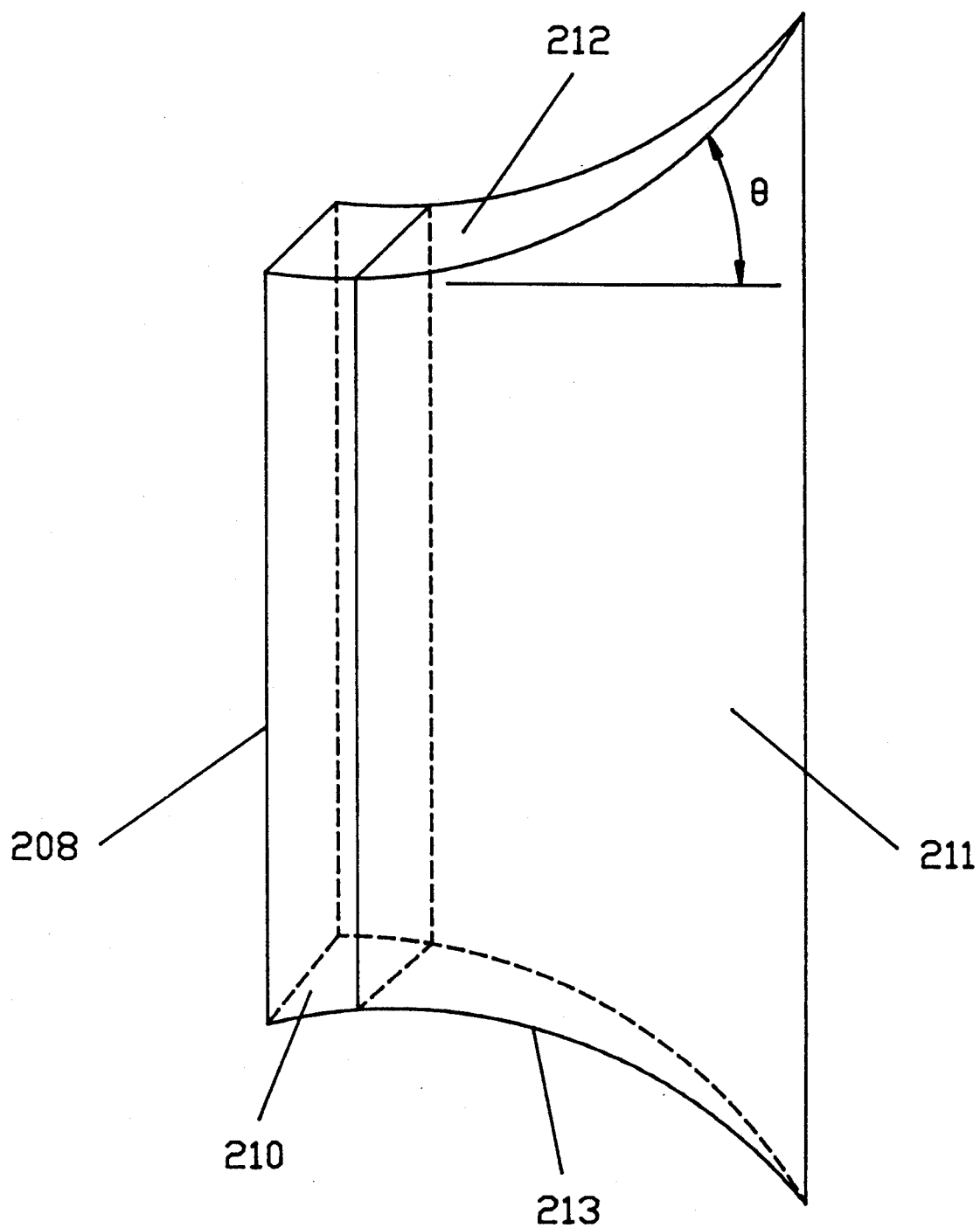

FIG. 7B is similar to FIG. 7A with the exception that the edge surfaces 212 and 213 are not parallel to each other. As shown in the figure the edge surfaces diverge the flow around the protrusions similar to a snowplow, again increasing the axial flows and turbulence within the screening zone. The diverging angle $\phi$ may be of any angle between 0° and 60°. The edges may be a plane surface or at some radius or curved surface.

Figure 7C:
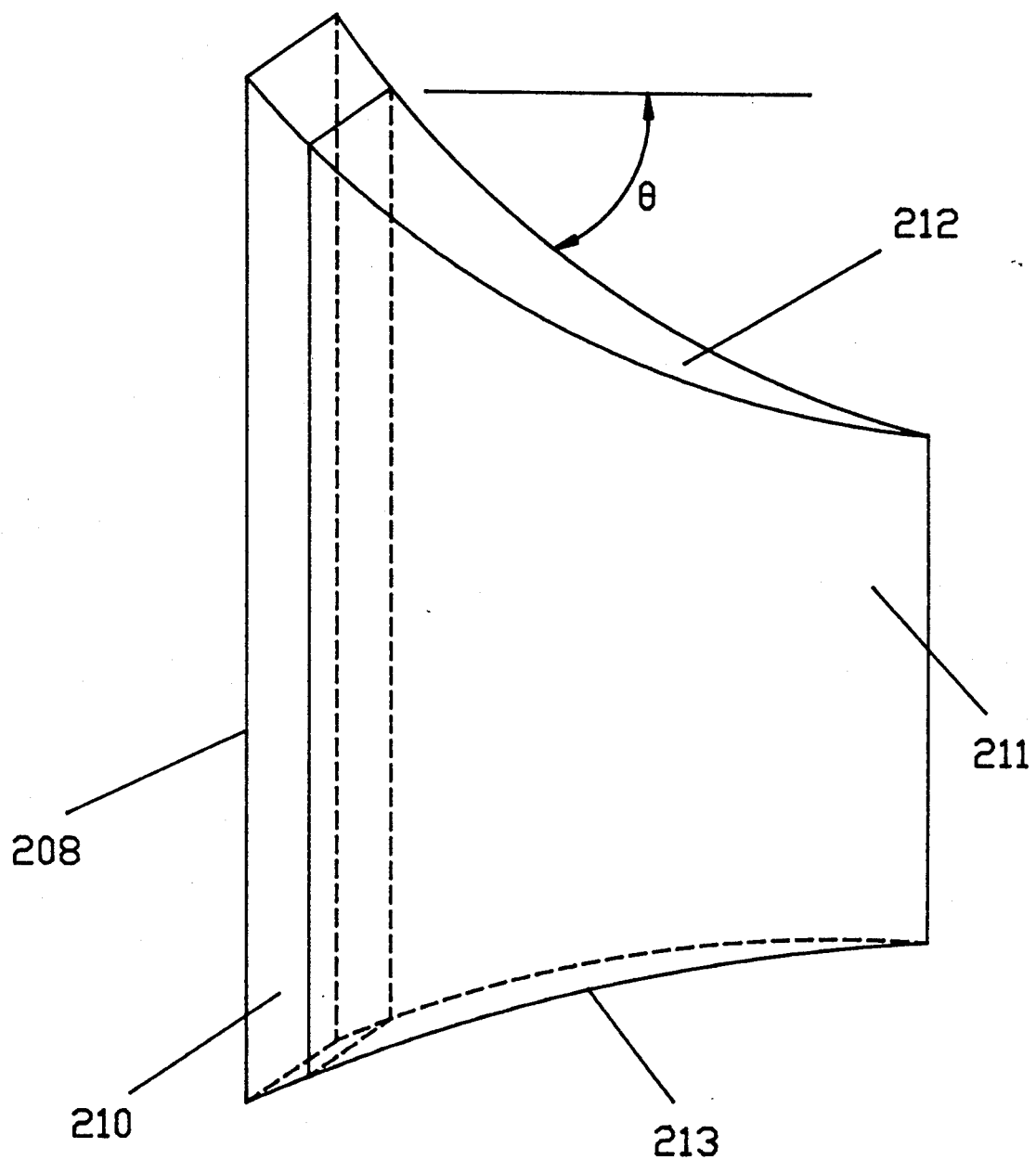

The protrusions shown in FIG. 7C are similar to the other protrusions except that the edge surfaces 212 and 213 converge instead of diverging like the protrusion shown in FIG. 10B. The edge surfaces converge at an angle with a value between 0° and 60°. Again similarly to FIG. 7C, the edge surfaces may he a plane or curved surface. This shape of protrusions also induces the flow in the axial direction. Obviously another shape of protrusion could have one edge diverging while the other edge converging.

The screen cylinder has apertures at the bottom of the grooves or in the space between two bars, and the apertures may be positioned on a plurality of rows within each groove or in the space between two bars.

Figure 8:
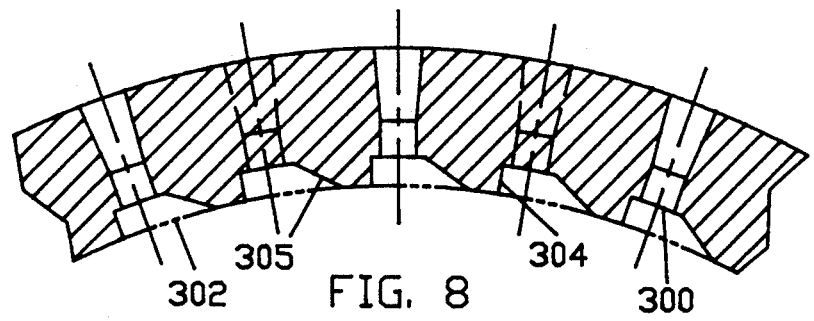
FIGS. 8-14 illustrate different embodiments of the contoured surface of the screen plate which may be used with the rotor according to the present invention.
Figure 9:
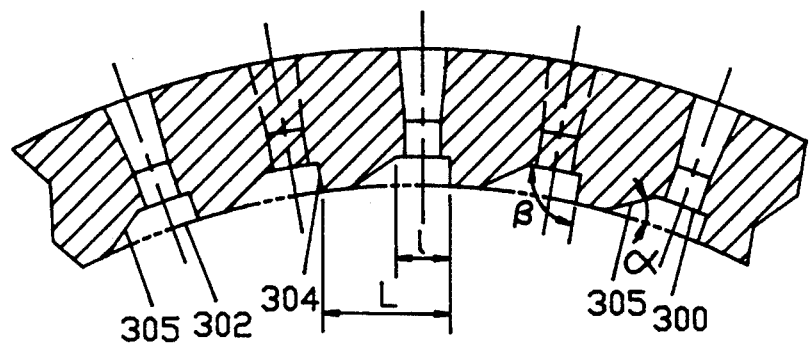

In the embodiments of FIGS. 8 and 9, the groove in the screen is formed of a bottom plane 300 which is substantially parallel with the envelope surface 302 of the screen surface, an upstream side plane 304 as seen standing from the bottom of the groove and a downstream side plane 305. In FIG. 8, the angle between the envelope surface of the screen surface and the upstream side plane 304, or in other words, between the plane tangenting the envelope surface of the screen surface close to this side plane, and this side plane is approximately 90° and the angle between the envelope surface of the screen surface and the downstream side plane 305 is 5°–60°. In FIG. 9 the angle $\alpha$ is 5°–60°, and the angle $\beta$ is 90°. The perforations of the screen plate are disposed on the bottom planes 300 of the grooves.

Figure 10:
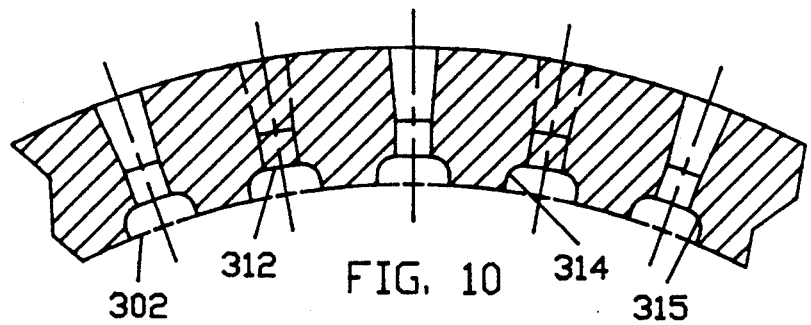

In the embodiment illustrated in FIG. 10, the grooves are U-shapes and both side panes 314 and 315 are substantially perpendicular to the envelope surface 302 of the screen surface.

Figure 11:
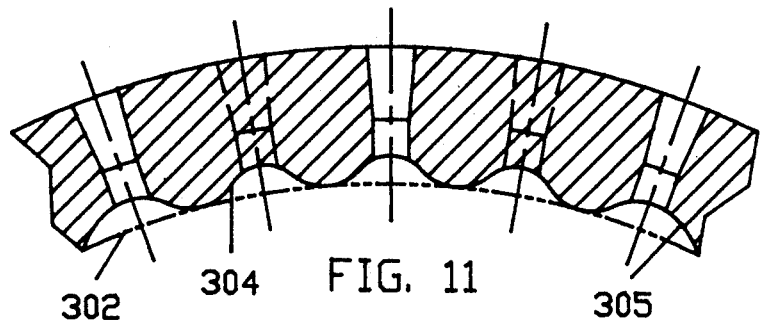

In the embodiment of FIG. 11, the screen surface is undulant, and both sides 304 and 305 of the grooves are inclined with regard to the envelope surface 302 of the screen surface.

Figure 12:
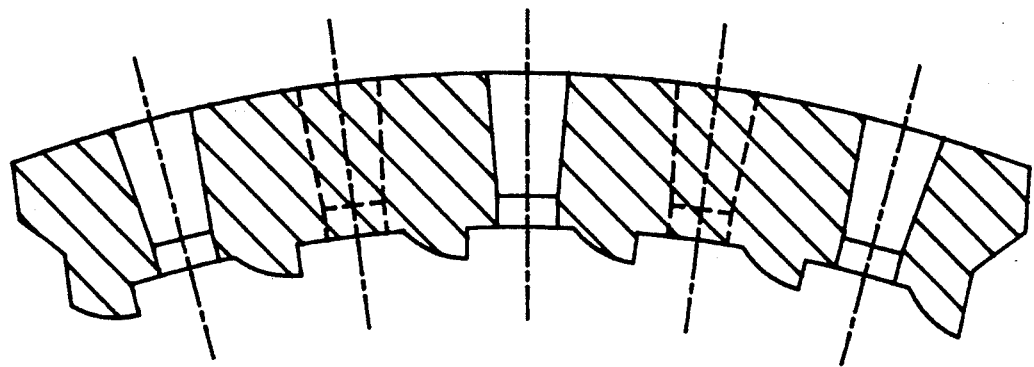
Figure 13:
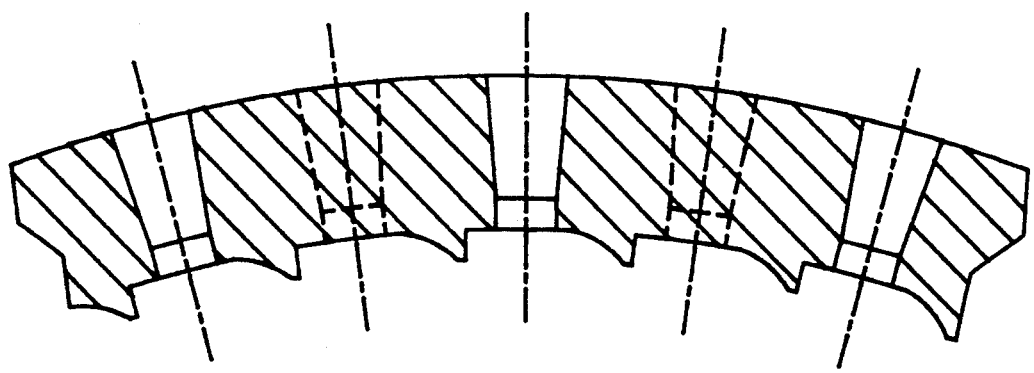
Figure 14:
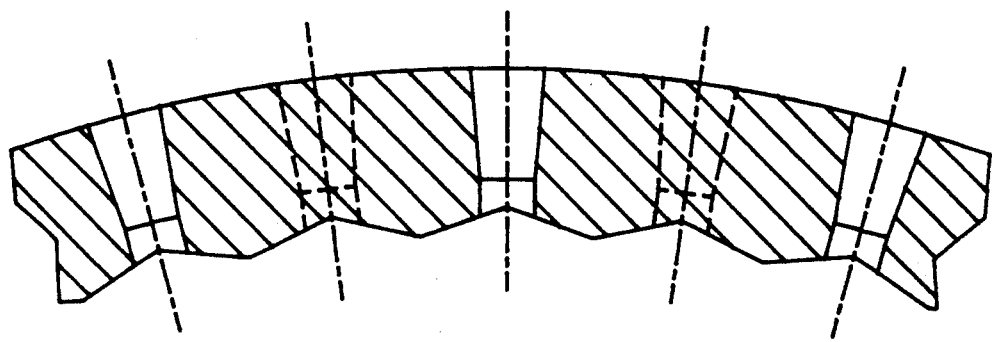
Figure 15A:
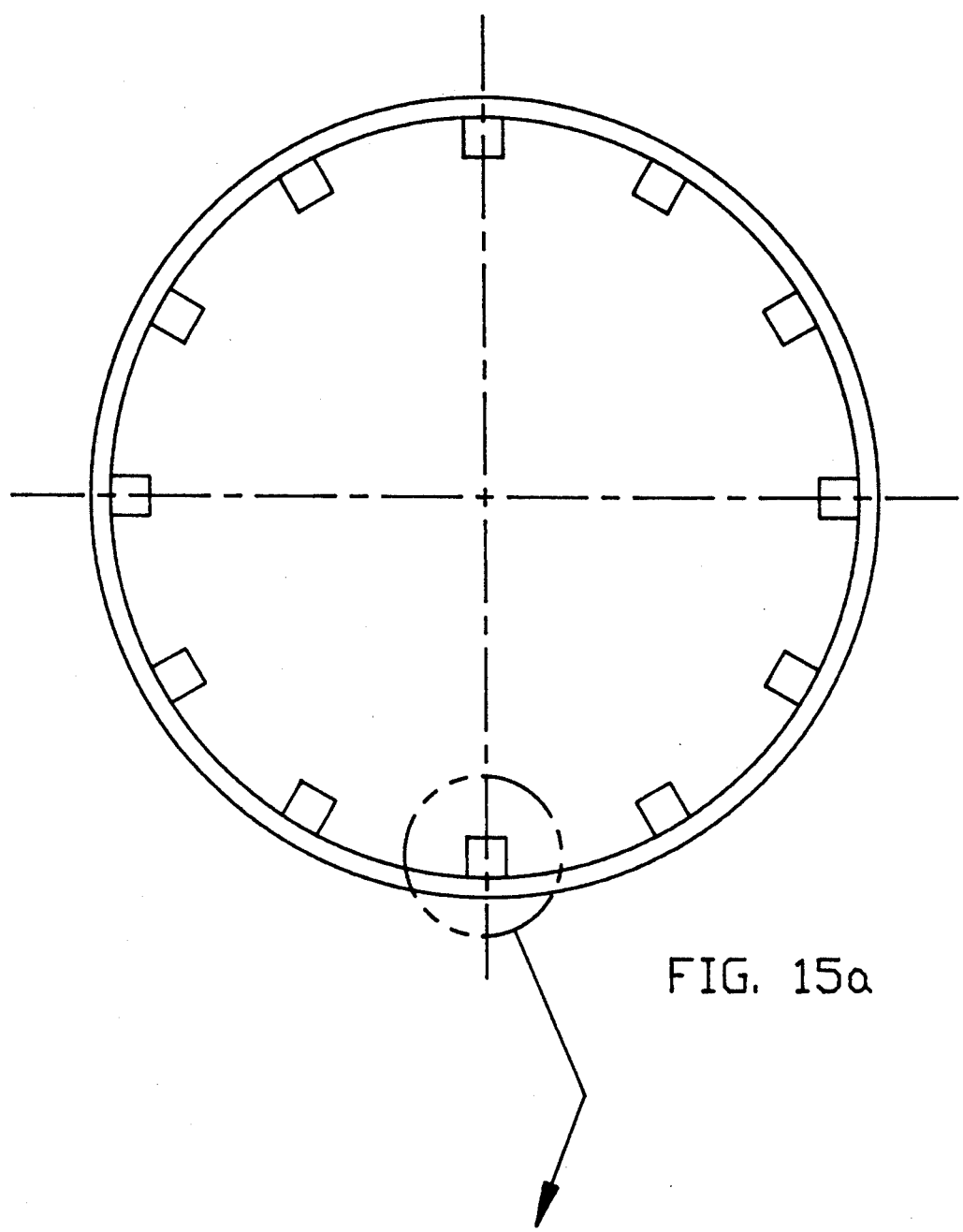
FIGS. 15a and 15b show the contoured surface of the screen plate which has bars instead of grooves.
Figure 15B:
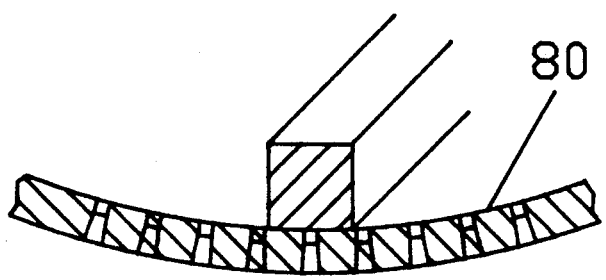

In the embodiments of FIGS. 12 and 13, the grooves have two side planes, a bottom plane and an upper plane, one side plane is perpendicular to the envelope surface of the screen cylinder, and the other side pane is curved, convex or concave with respect to the envelope surface. In the embodiment of FIG. 14, the sides of the grooves have an inverted V-shape configuration.

The apparatus is operated with the rotor disposed in the inlet side of the screen but is intended both for outflow operation or inflow operation.

The advantage of the arrangement of the protrusions as shown is that in addition to the generation of pulses at the surface of the screen, the resistance to rotation of the rotor is reduced thus reducing the power consumption. Further, the narrowing or widening shape of the passages between adjacent protrusions in each row provides turbulence in the axial direction which significantly contributes to the cleaning of the upstream surface of the screen thus improving the overall screening efficiency. Due to the shape and orientation of the protrusions, flow and velocity are induced in the axial direction both towards the inlet and the reject.

This invention is not limited to the particular shape of the protrusions shown and described, and it should be understood that other shapes may be used depending upon different applications.

What is claimed is:

1. In an apparatus for screening pulp which comprises a vessel, a screen cylinder having an envelope surface and a contour surface within the vessel, a rotor moving in the vicinity of the screen cylinder at a predetermined speed on an axis of rotation, said rotor having an axial length, an inlet for the unscreened pulp, a first outlet for the accept screened pulp in said vessel and a second outlet for the reject, said first and second outlets being in operative communication with said screen cylinder, said rotor having a cylindrical shape and having a contoured surface consisting of a plurality of spaced protrusions disposed about the periphery of the rotor, each of said protrusions being shorter than the axial length of said rotor, each protrusion having a side plane essentially perpendicular to the rotor surface which is the leading surface, two edge surfaces, an upper plane parallel to the rotor surface and an inclined plane, said inclined plane forming an angle between 5°-60° with said rotor surface whereby high frequency high intensity positive pulses are generated with additional high intensity axial shears with improved screening at a pulp concentration up to 6%.

2. In an apparatus for screening pulp which comprises a vessel, a screen cylinder having an envelope surface and a contour surface within the vessel, a rotor moving in the vicinity of the screen cylinder at a predetermined speed on an axis of rotation, said rotor having an axial length, an inlet for the unscreened pulp, a first outlet for the accept screened pulp in said vessel and a second outlet for the reject, said first and second outlets being in operative communication with said screen cylinder, said rotor having a cylindrical shape, the improvement which consisting of said rotor having a contoured surface consisting of plurality of spaced protrusions disposed about the periphery of the rotor, each of said protrusions being shorter than the axial length of said rotor, each protrusion having an inclined plane or surface which is the leading surface, an upper plane or surface parallel to the rotor surface, a side plane or surface, and two edge planes or surfaces, said inclined plane or surface forming an angle between 5°-60° with said rotor surface whereby a lower frequency pumping action, high frequency high intensity positive pulses are generated with additional high intensity axial shears with improved screening at a pulp concentration up to 6%.

3. In an apparatus for screening pulp which comprises a vessel, a screen cylinder having an envelope surface and a contour surface within the vessel, a rotor moving in the vicinity of the screen cylinder at a predetermined speed on an axis of rotation, said rotor having an axial length, an inlet for the unscreened pulp, a first outlet for the accept screened pulp in said vessel and a second outlet for the reject, said first and second outlets being in operative communication with said screen cylinder, said rotor having a cylindrical shape, the improvement which consisting of said rotor having a contoured surface consisting of plurality of spaced protrusions disposed about the periphery of the rotor, each protrusion having a first plane or surface essentially parallel to the envelope surface, an inclined plane or surface forming an angle between 5°-60° with said rotor surface, a plane or surface essentially perpendicular to the rotor surface, an upper plane or surface essentially parallel to the rotor surface, at least one protrusion having the inclined plane or surface as a leading surface and at least one protrusion having the substantially perpendicular plane or surface as a leading surface, whereby a lower frequency pumping action, high frequency high intensity positive pulses are generated with additional high intensity axial shears with improved screening at a pulp concentration up to 6%.

4. The apparatus according to claim 1, 2 or 3 wherein said leading surfaces of the protrusions are spaced from each other in the direction of the axis of rotation of the rotor.

5. The apparatus according to claim 1, 2 or 3 wherein said leading surfaces of the protrusions are spaced from each other in a direction parallel to the axis of rotation of the rotor.

6. The apparatus according to claim 1, 2 or 3 wherein said leading surfaces of the protrusions are spaced from each other in a direction at an angle to the axis of rotation of the rotor.

7. The apparatus according to claim 1, 2 or 3 wherein the protrusions are arranged in equidistantly spaced axial rows generally parallel to the direction of the axis of rotation, each pair of adjacent protrusions of a row being spaced from each other to define therebetween a passage.

8. The apparatus according to claim 1, 2 or 3 wherein said screen cylinder has an inlet side and an outlet side, said inlet side having a contoured surface produced with grooves or bars, or both grooves and bars.

9. The apparatus according to claim 1, 2 or 3 wherein said rotor is located on the inlet side of the screen cylinder.

10. The apparatus according to claim 1, 2 or 3 wherein said envelope surface of said screen cylinder has grooves with apertures, the apertures are at the bottom of the grooves, the bottom plane of the grooves is essentially paralel to the envelope surface, the grooves have two side planes, one side plane of the grooves is substantially perpendicular to the envelope surface of the screen surface and the other side plane is inclined with regard to said envelope surface.

11. The apparatus according to claim 1, 2 or 3 wherein said inlet is recessed in the screen surface and said screen cylinder has grooves in the side of the inlet recessed in the screen surface, the grooves being formed of an upstream side plane, as seen standing from the bottom of the grooves, a downstream side plane and a bottom plane, said bottom plane being substantially parallel to the envelope surface of the screen cylinder, the grooves having apertures in the bottom plane, the upstream side plane of the grooves being substantially perpendicular to said envelope surface and the downstream side place of the grooves forming a 60°-05° angle against said envelope surface.

12. The apparatus according to claim 1, 2 or 3 wherein said contoured surface of said screen cylinder is formed by grooves, the downstream side plane and the upstream side plane of the grooves are connected to each other.

13. The apparatus according to claim 1, 2 or 3 wherein said contoured surface of said screen cylinder is formed by grooves, the downstream side plane of the grooves is substantially perpendicular to the envelope surface of the screen surface and the upstream side plane is inclined.

14. The apparatus according to claim 1, 2 or 3 wherein the contoured surface of the screen cylinder consists of grooves and both side planes of the grooves are substantially perpendicular to the envelope surface of the screen.

15. The apparatus according to claim 1, 2 or 3 wherein the screen cylinder has grooves having apertures, the apertures are at the bottom of the grooves, the bottom plane of the grooves is parallel to the envelope surface the grooves have two side planes and an upper plane, one side plane of the grooves is substantially perpendicular to the envelope surface of the screen cylinder and the other side pane is curved with regard to said envelope surface.

16. The apparatus according to claim 1, 2 or 3 wherein the screen cylinder has grooves having apertures, the apertures are at the bottom of the grooves, the bottom plane of the grooves is parallel to the envelope surface, the grooves have two side planes and an upper plane, one side plane of the grooves is substantially perpendicular to the envelope surface of the screen cylinder wherein said side plane is convex or concave with respect to said envelope surface of the screen cylinder.

17. The apparatus according to claim 1, 2 or 3 wherein said envelope surface of the screen cylinder is undulant, the screen cylinder has grooves and both sides of the grooves are inclined with respect to the envelope surface.

18. The apparatus according to claim 1, 2 or 3 wherein said contoured surface of the screen cylinder is formed by grooves and said grooves have an inverted V configuration.

19. The apparatus according to claim 1, 2 or 3 wherein said rotor has an inner surface, said inner surface is contoured, and the screen cylinder has an outer contoured surface, and said inner surface of the rotor faces said outer contoured surface of the screen cylinder.

20. The apparatus according to claim 1, 2 or 3 wherein the screen cylinder has a contoured surface and said contoured surface of the screen is on the inside of the screen cylinder.

21. The apparatus according to claim 1, 2 or 3 wherein said contoured surface of the screen cylinder is formed by grooves, the grooves have an upstream side plane and a downstream side plane, both said upstream side plane and said downstream side plane are inclined thereto and are connected to each other by means of a plane substantially parallel to said envelope surface.

22. The apparatus according to claim 1, 2 or 3 wherein said contoured surface of the screen cylinder is formed by grooves and a plurality of rows of apertures is provided at the bottom of each grooves.

23. The apparatus according to claim 1, 2 or 3 wherein said screen cylinder has a contoured surface on the inlet side produced with bars.

* * * * *